J. H. BELL.
TIMING DEVICE FOR CARRIER PIGEONS.
APPLICATION FILED OCT. 14, 1912.
1,199,230.  Patented Sept. 26, 1916.
FIG. I.
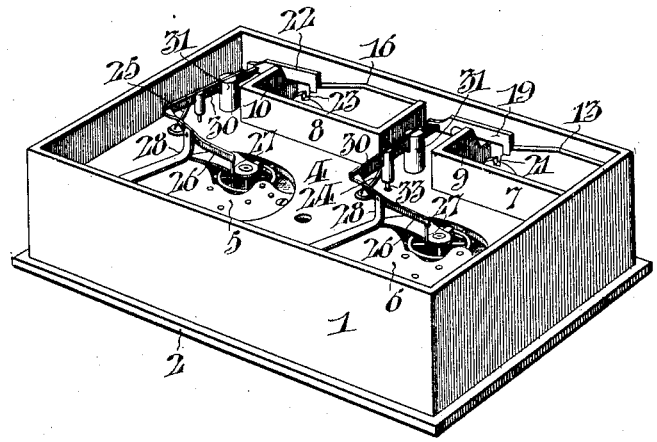
FIG. III.
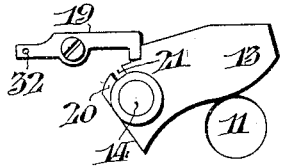
FIG. II.
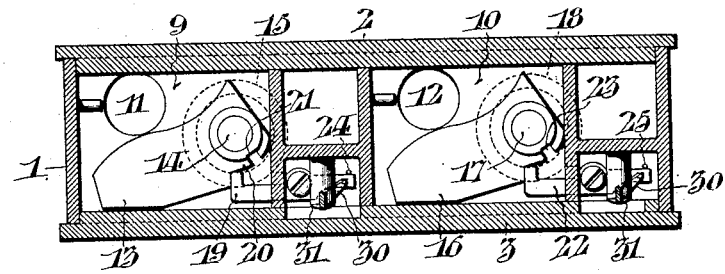
FIG. IV.
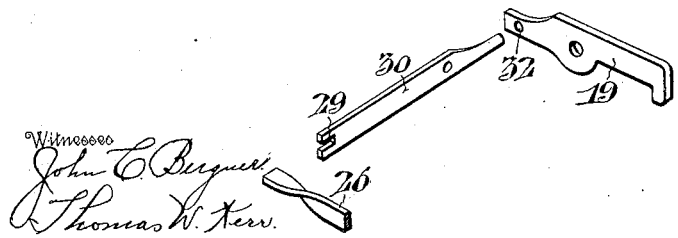
Inventor
James H. Bell,
Witnesses
John E. Bergner
Thomas W. Kerr
By Maley & Paul
Attorneys

UNITED STATES PATENT OFFICE.

JAMES H. BELL, OF PHILADELPHIA, PENNSYLVANIA.

TIMING DEVICE FOR CARRIER-PIGEONS.

1,199,230. Specification of Letters Patent. Patented Sept. 26, 1916.

Application filed October 14, 1912. Serial No. 725,595.

*To all whom it may concern:*

Be it known that I, JAMES H. BELL, of Philadelphia, in the county of Philadelphia and State of Pennsylvania, have invented certain new and useful Improvements in Timing Devices for Carrier Pigeons, whereof the following is a specification, reference being had to the accompanying drawings.

The invention relates more particularly to devices for timing pigeons, wherein the timing device is stopped or started by mechanism controlled by a shutter closing an opening leading to a compartment into which the identification band is to be placed.

An object of the invention is to provide means for positively controlling the stop mechanism for the timing device from the shutter, so that said stop mechanism cannot be tampered with, or moved until the shutter is moved to close the opening into the compartment for the identification band.

In the drawings which show by way of illustration one embodiment of the invention, Figure I, is a perspective view of a timing device embodying my invention, one of the covers being removed to show the stop mechanism for controlling the timing mechanism. Fig. II, is a longitudinal section through the casing and through the compartments for the identification band. Fig. III, is an enlarged detail showing the shutter and the manner in which said shutter positively prevents the stop mechanism from being moved when the shutter is open. Fig. IV, is a detail perspective view of one of the lever trains comprised in the stop mechanism.

The invention, as herein illustrated, is shown applied to the timing device described in Patent No. 703,381, granted July 1st, 1902, to Edward Buysse. This timing device consists of an outer casing 1, having a removable cover 2, and a removable cover 3. This casing is divided by a horizontal partition 4, which is formed with seats in which are located the timing devices 5, and 6. The casing is also provided with vertical partitions 7, and 8, which form two separate compartments 9, and 10, respectively.

The side wall of the casing is formed with an opening 11, which leads to the compartment 9, and with an opening 12, which leads to the compartment 10. The opening 11, is closed by a shutter 13, which is pivoted at 14, to the wall of the casing and the pivot support of the shutter which is formed integral therewith extends to the outer face of the casing, and a thumb nut 15, is attached thereto, whereby the shutter 13, may be swung so as to close the opening 11, or moved so as to uncover the same.

A shutter 16, is pivoted at 17, to the wall of the casing, and the pivot of said shutter extends to the outer face of the casing, and is provided with a thumb nut 18, which may be used for turning the shutter 16, so as to cover or uncover the opening 12.

A pawl or locking dog 19, serves to lock the shutter 13, in closed position. The shutter is formed with a curved shank section 20, and with a notch 21, into which the pawl drops when the shutter is closed for locking the same, so that the shutter cannot be turned about its pivotal support until said pawl is withdrawn. A pawl 22, of similar construction to the pawl 19, serves to lock the shutter 16. Said shutter is formed with a notch 23, into which the end of the pawl drops. The pawl or locking dog 19, is pressed toward the shutter shank by a spring 24, while the pawl or locking dog 22, is pressed toward the shank of its shutter by a spring 25. The springs 24, and 25, as herein shown, are attached to the horizontal partition of the casing and rest on top of each respective pawl.

The timing device 6, is stopped by a swinging lever 26, which carries a flexible finger 27, adapted to engage the balance wheel on the timing device 6. This lever 26, is pivoted to a bracket arm 28. The outer end of the lever 26, extends into the forked end 29, of a lever 30. This lever 30, is pivotally supported by a post 31, which is located intermediate the ends of the lever. The end of the lever opposite the forked end extends into an opening 32, which is formed in the locking dog or pawl 19.

From the above construction, it will be apparent that the lever 26, when swung about its pivotal support must also swing the lever 30, and the lever 30, can only be swung about its pivotal support when the locking dog 19, is swung about its pivotal support. If, therefore, the locking dog 19, is held from movement, then the lever 26, will also be held from movement, and it will be impossible to release the flexible finger 27, from the balance wheel.

This locking pawl 19, rests on the shank of the shutter and can only be moved in a direction which would release the flexible finger from the balance wheel when the end of the locking pawl is in register with a notch in the shank of the shutter. Therefore, said pawl 19, cannot be moved in a direction to release the balance wheel except when the shutter has been moved so as to entirely close the opening 11, in the side wall of the casing.

In the patent to Buysse, above referred to, the lever for moving the flexible finger for engaging the balance wheel, rests on the locking pawl, and, therefore, when the shutter is opened, it has been possible to tamper with the timing device by means of a wire or flexible strips which are inserted over the vertical partition 7, or by boring a hole either through the bottom or cover of the casing, and the insertion of a suitable wire. The timing device could thus be released and operated before the shutter was closed. By my improved device, however, wherein the stop mechanism for the timing device is positively connected with the controlling dog for the shutter, and the shutter and controlling dog are so formed that said controlling dog cannot be moved to release the timing device until the shutter is fully closed, I avoid all possible chance of tampering with the timing device through the opening prior to the closing of the shutter.

The stop mechanism for the timing device 5, is precisely the same as that for the timing device 6. Similar letters have been applied thereto, and detailed description thereof is not thought necessary. When it is desired to release the shutter, the lever 30, is manipulated by a push button, which carries a rod or bar 33, in the manner fully described in the patent above referred to.

While I have described my device as applied to a timing mechanism wherein the balance wheel is released when the shutter is closed, it is obvious that said device is equally applicable to the form of timing device wherein the balance wheel is stopped when the shutter is closed.

While I have also shown my improvement as applied to a timing device of the Buysse type, it will be apparent that said invention is not limited to this particular construction of timing device, but may be equally used in connection with other timing devices wherein the timing mechanism is controlled by a shutter which covers an opening leading to the compartment into which the identification band is placed.

It will be obvious also that various changes in the details of construction and arrangement of parts may be made without departing from the spirit of the invention, as set forth in the appended claims.

Having thus described my invention, I claim:

1. In a timing device for carrier pigeons, the combination of a casing having a compartment therein, said casing having an opening leading to said compartment, a pivoted shutter for closing said opening, a timing mechanism in said casing, a device movable into engagement with a moving part of the timing mechanism for positively stopping said timing mechanism, a locking dog for holding said shutter closed, and devices for positively connecting said locking dog to said stopping device, whereby said stopping device is positively held from movement until the shutter is closed, said pivoted shutter having a notch formed therein adapted to permit a movement of the locking dog to release the timing device when the shutter is closed.

2. In a timing device for carrier pigeons, the combination of a casing having a compartment therein, said casing having an opening leading to said compartment, a pivoted shutter for closing said compartment, a timing mechanism in said casing, a pivoted locking dog engaging said shutter and adapted to lock said shutter closed, a lever positively connected with said first named lever and movable therewith, a finger carried by the last named lever and adapted to move into the path of travel of the moving part of the timing mechanism for positively stopping the same until the shutter is closed, said shutter being so constructed as to permit a movement of said levers to release the timing device when the shutter is closed.

In testimony whereof, I have hereunto signed my name at Philadelphia, Pennsylvania, this twelfth day of October, 1912.

JAMES H. BELL.

Witnesses:
C. BRADFORD FRALEY,
E. L. FULLERTON.